US009856984B2

(12) United States Patent
Watanabe et al.

(10) Patent No.: US 9,856,984 B2
(45) Date of Patent: Jan. 2, 2018

(54) SEALING DEVICE

(71) Applicant: NOK CORPORATION, Tokyo (JP)

(72) Inventors: Koji Watanabe, Kitaibaraki (JP);
Katsuyoshi Sakuma, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/318,834

(22) PCT Filed: Jun. 2, 2015

(86) PCT No.: PCT/JP2015/065939
§ 371 (c)(1),
(2) Date: Dec. 14, 2016

(87) PCT Pub. No.: WO2015/198807
PCT Pub. Date: Dec. 30, 2015

(65) Prior Publication Data
US 2017/0138483 A1 May 18, 2017

(30) Foreign Application Priority Data
Jun. 25, 2014 (JP) .................. 2014-130634

(51) Int. Cl.
*F16J 15/32* (2016.01)
*F16J 15/34* (2006.01)

(52) U.S. Cl.
CPC ....... *F16J 15/3464* (2013.01); *F16J 15/3496* (2013.01)

(58) Field of Classification Search
CPC .. F16J 15/3244; F16J 15/3248; F16J 15/3252; F16J 15/3256; F16J 15/3464; F16J 15/3496
See application file for complete search history.

(56) References Cited

U.S. PATENT DOCUMENTS 3,156,474 A * 11/1964 Nelson ................. F16J 15/3256
277/571
3,479,728 A * 11/1969 Micai ................... F16J 15/3256
277/565

(Continued)

FOREIGN PATENT DOCUMENTS

JP   H03-88062 U   9/1991
JP   H04-010164 U  1/1992

(Continued)

OTHER PUBLICATIONS

Korean Office Action dated Apr. 17, 2017—with English Translation.

*Primary Examiner* — Gilbert Y Lee
(74) *Attorney, Agent, or Firm* — Harness, Dickey & Pierce, P.L.C.

(57) ABSTRACT

A sealing device seals an annular gap between a shaft and a housing, and includes a first annular member 200 provided with a first cylindrical part 201 that is secured to an outer circumferential surface of the shaft 20, and a first flange 202 extending radially outward from the first cylindrical part 201; a second annular member 300 provided with a second cylindrical part 301 that is secured to an outer circumferential surface of the first cylindrical part 201, and a second flange 302 extending radially outward from the second cylindrical part 301; and an endless resin sealing ring 400 disposed between the first flange 202 and the second flange 302, the sealing ring providing a seal between itself and a shaft hole in the housing 30, and between itself and one of the first flange 202 and the second flange 302 on a low pressure side.

4 Claims, 13 Drawing Sheets

(56) References Cited

U.S. PATENT DOCUMENTS

| | | | | |
|---|---|---|---|---|
| 3,682,488 | A * | 8/1972 | Matsushima | F16J 15/3256 277/551 |
| 5,201,528 | A * | 4/1993 | Upper | F16J 15/3256 277/394 |
| 6,267,382 | B1 | 7/2001 | Auber | |
| 6,354,598 | B1 * | 3/2002 | Huang | F16J 15/3256 277/551 |
| 2008/0029967 | A1 * | 2/2008 | Nakagawa | F16J 15/164 277/349 |
| 2009/0108533 | A1 | 4/2009 | Ashida et al. | |
| 2012/0018957 | A1 | 1/2012 | Watanabe | |
| 2012/0068419 | A1 * | 3/2012 | Berdichevsky | F16J 15/164 277/549 |
| 2013/0127120 | A1 | 5/2013 | Nagai et al. | |

FOREIGN PATENT DOCUMENTS

| | | |
|---|---|---|
| JP | H09-210211 A | 8/1997 |
| JP | 2002-340197 A | 11/2002 |
| JP | 2009-103264 A | 5/2009 |
| JP | 4610797 B2 | 1/2011 |
| WO | 2011/105513 A1 | 9/2011 |
| WO | 2011/162283 A1 | 12/2011 |

\* cited by examiner

SEALING DEVICE

CROSS-REFERENCE TO RELATED APPLICATIONS

This application is a National Stage of International Application No. PCT/JP2015/065939, filed Jun. 2, 2015 (now WO 2015/198807A1), which is based on Japanese Application No. 2014-130634, filed Jun. 25, 2014. The entire disclosures of each of the above applications are incorporated herein by reference.

FIELD

The present disclosure relates to a sealing device that seals an annular gap between a shaft and a housing that rotate relative to each other to maintain a pressure of a sealed fluid.

BACKGROUND

In car auto transmissions (ATs) or continuously variable transmissions (CVTs), resin sealing rings are customarily used for sealing an annular gap between a shaft and a housing that rotate relative to each other, in order to maintain a hydraulic pressure. Sealing rings of this type are sometimes fitted in annular grooves provided on the outer circumference of the shaft. When the resin sealing ring is of an endless type without any joints, then in order to fit such a sealing ring into an annular groove, the sealing ring is moved along the shaft to the position of the annular groove while being enlarged radially, after which it may be necessary to correct the form of the sealing ring by reducing its radial size. Because of such poor mountability of the endless sealing ring into an annular groove, sealing rings with joints have been used widely in recent years. While various shapes of joints have been proposed for effectively minimizing leakage of the sealed fluid, there is still a possibility that a small amount of fluid would leak regardless of the shape of a joint.

Meanwhile, for the sealing ring that is mounted into an annular groove of a shaft, it has been known to provide a recess in a side face of the sealing ring as a technique for reducing sliding resistance between the side face of the sealing ring and a side face of the annular groove (see PTL 1). In order to effectively reduce the sliding resistance, it is desirable that a surface receiving sliding contact of the side face of the sealing ring have a small surface roughness. Since it is generally difficult to reduce the surface roughness of a side face of an annular groove, a sealing ring such as that mentioned above has sometimes been used in an annular groove with a side face whose surface roughness was not sufficiently small. In such a case, the sliding resistance of the sealing ring could not be reduced effectively.

CITATION LIST

Patent Literature

[PTL 1] WO 2011/105513
[PTL 2] Japanese Patent Application Laid-open No. 2002-340197
[PTL 3] Japanese Patent No. 4610797
[PTL 4] WO 2011/162283

SUMMARY

Technical Problem

An object of the present disclosure is to provide a sealing device, which seals an annular gap between a shaft and a housing that rotate relative to each other, to maintain a pressure of a sealed fluid, with excellent sealing properties and mountability.

Solution to Problem

The present disclosure adopts the following means to achieve the object noted above. Namely, the sealing device of the present disclosure is a sealing device that seals an annular gap between a shaft and a housing that rotate relative to each other to maintain a pressure of a sealed fluid, and includes: a first annular member provided with a first cylindrical part that is secured to an outer circumferential surface of the shaft, and a first flange extending radially outward from the first cylindrical part; a second annular member provided with a second cylindrical part that is secured to an outer circumferential surface of the first cylindrical part, and a second flange extending radially outward from the second cylindrical part; and an endless resin sealing ring disposed between the first flange and the second flange, the sealing ring providing a seal between itself and a shaft hole in the housing for the shaft to pass through, and between itself and one of the first flange and the second flange on a low pressure side.

According to the present disclosure, the endless sealing ring provides a seal between the ring and the shaft hole in the housing and between the ring and one of the first flange and the second flange on the low pressure side. Therefore, the annular gap between the shaft and the housing can be sealed more effectively as compared to sealing rings that have joints. With the structure of the sealing device according to the present disclosure, the sealing device can be assembled without radially enlarging the endless sealing ring, by bringing the first annular member and second annular member closer to each other from both sides in the axial direction of the sealing ring and fixedly joining them together. This assembling enables easy attachment of the sealing device to the shaft even though the sealing device uses an endless sealing ring. Thus the sealing device according to the present disclosure achieves both of good sealing properties and mountability.

For applications where a sealing ring slides on a side face of an annular groove formed in a shaft as in the conventional technique mentioned above, it was difficult to sufficiently reduce the surface roughness of the side face so as to reduce sliding resistance. However, with the sealing device according to the present disclosure, since the first annular member and second annular member are both separate parts, it is relatively easy to reduce the surface roughness of the flange surface on the low pressure side on which the sealing ring slides to a desired small value. More specifically, the first annular member or second annular member may be fabricated from a metal sheet pretreated to have a desired surface roughness, for example, so that the surface of the flange that will be disposed on the low pressure side can have a surface roughness of a desired small value. Therefore, with the present disclosure, the sliding resistance of the sealing ring can be readily reduced even when the sealing device uses a sealing ring that slides on a flange on a low pressure side.

In the present disclosure, the sealing ring slides on a surface of the one of the first flange and the second flange on the low pressure side, the one of the flanges on the low pressure side may include a dynamic pressure generating groove on the surface on which the sealing ring slides, the groove having a circumferentially extending first groove, and a second groove extending radially inward from a circumferential center of the first groove and guiding the sealed fluid into the first groove. The first groove may be positioned within a sliding region in which the sealing ring slides.

With this configuration, the sealed fluid is guided into the dynamic pressure generating groove, so that the pressure of the sealed fluid acting on the sealing ring from the low pressure side and part of the pressure of the sealed fluid acting on the sealing ring from the high pressure side are counterbalanced. When the sealing ring slides on the surface of the flange on the low pressure side, the sealed fluid flows out from the first groove of the dynamic pressure generating groove to between the sliding surfaces, whereby dynamic pressure is generated. The dynamic pressure thus generated acts on the sealing ring to move in a direction away from the surface of the flange on the low pressure side. With these effects combined, the sliding resistance on the sealing ring is reduced.

The dynamic pressure generating groove is formed by the circumferentially extending first groove and the second groove extending radially inward from the circumferential center of the first groove, so that the dynamic pressure can be generated irrespective of the rotating direction of the sealing ring relative to the flange on the low pressure side. Moreover, since the first groove is formed at a position within the sliding region where the sealing ring slides, leakage of the sealed fluid (in particular, leakage in the radial direction) from the first groove is effectively prevented.

The first groove may be formed such that its depth reduces from a circumferential center toward both ends. With this configuration, the dynamic pressure can be generated effectively by the wedge effect.

The first groove may be configured such that the radial width decreases from the circumferential center toward both ends. With this configuration, the dynamic pressure can be generated effectively by the wedge effect, too.

Advantageous Effects of the Disclosure

As described above, the present disclosure can provide a sealing device, which seals an annular gap between a shaft and a housing that rotate relative to each other to maintain a pressure of a sealed fluid, with excellent sealing properties and mountability.

DRAWINGS

DETAILED DESCRIPTION

Modes for carrying out this disclosure will be hereinafter illustratively described in detail based on specific embodiments with reference to the drawings. It should be noted that, unless otherwise particularly specified, the sizes, materials, shapes, and relative arrangement or the like of constituent components described in the embodiments are not intended to limit the scope of this disclosure. The sealing device according to the embodiments is used for applications in which an annular gap between a shaft and a housing that rotate relative to each other is sealed to maintain a hydraulic pressure in car transmissions such as ATs and CVTs. In the description below, "high pressure side" and "low pressure side" refer to one side with a higher hydraulic pressure and the other side with a lower hydraulic pressure, respectively, when there is a pressure difference between both sides of the sealing device.

Example 1

Figure 1:
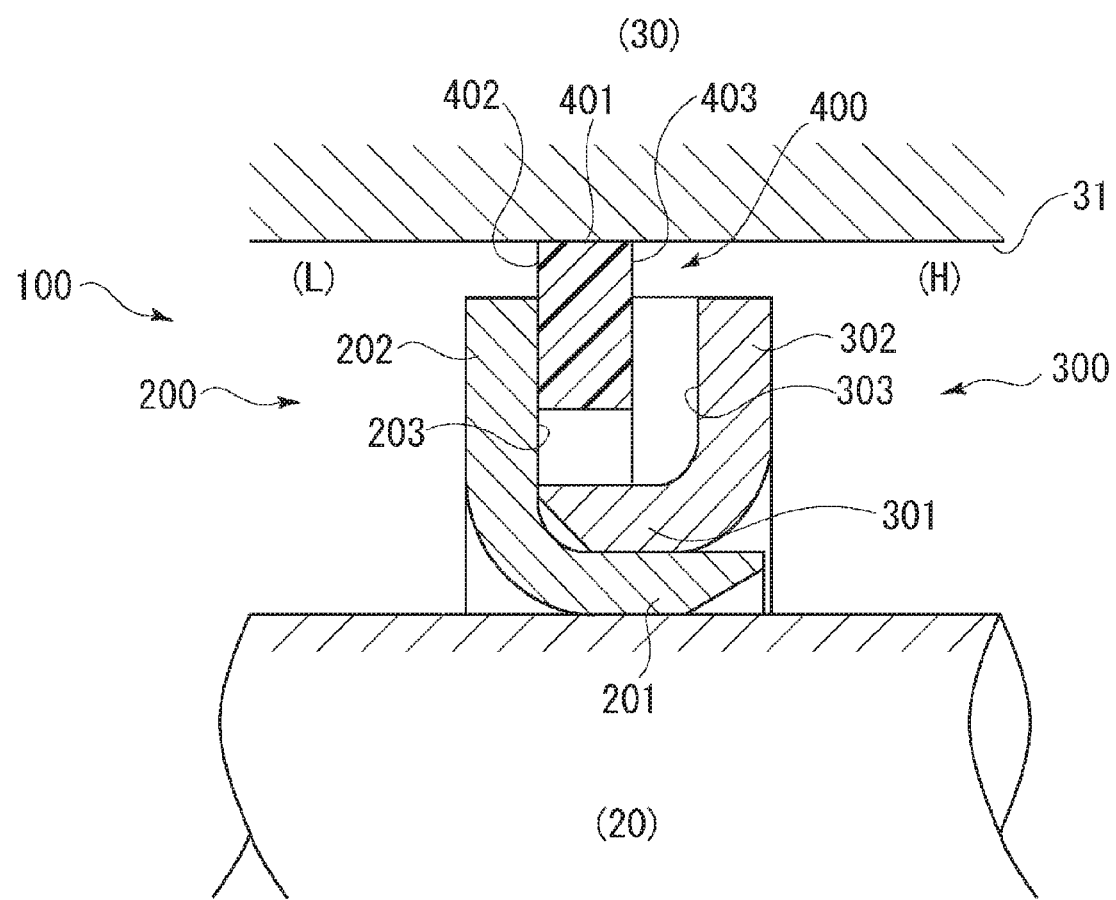
FIG. 1 is a schematic cross-sectional view illustrating a state of use of a sealing device according to Embodiment 1.
Figure 2:
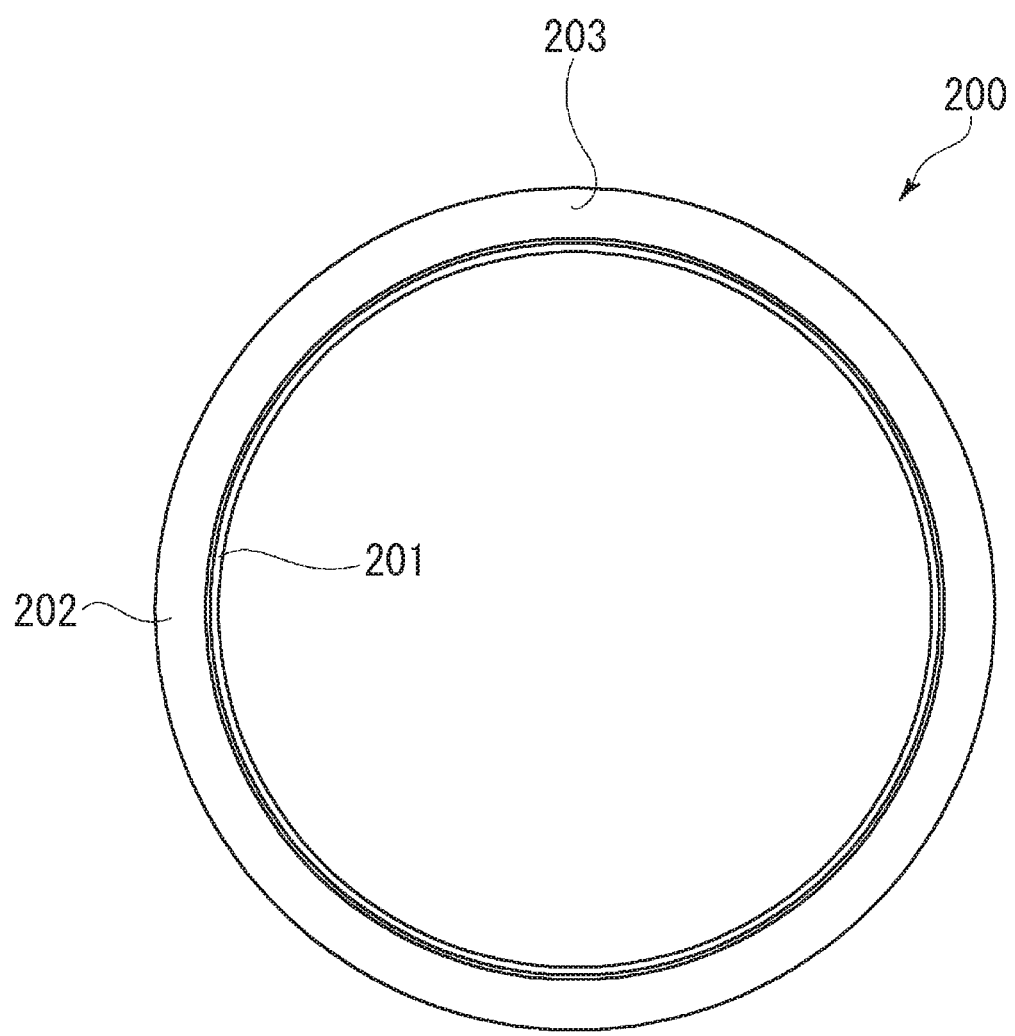
FIG. 2 is a side view of a first annular member according to Embodiment 1.
Figure 3:
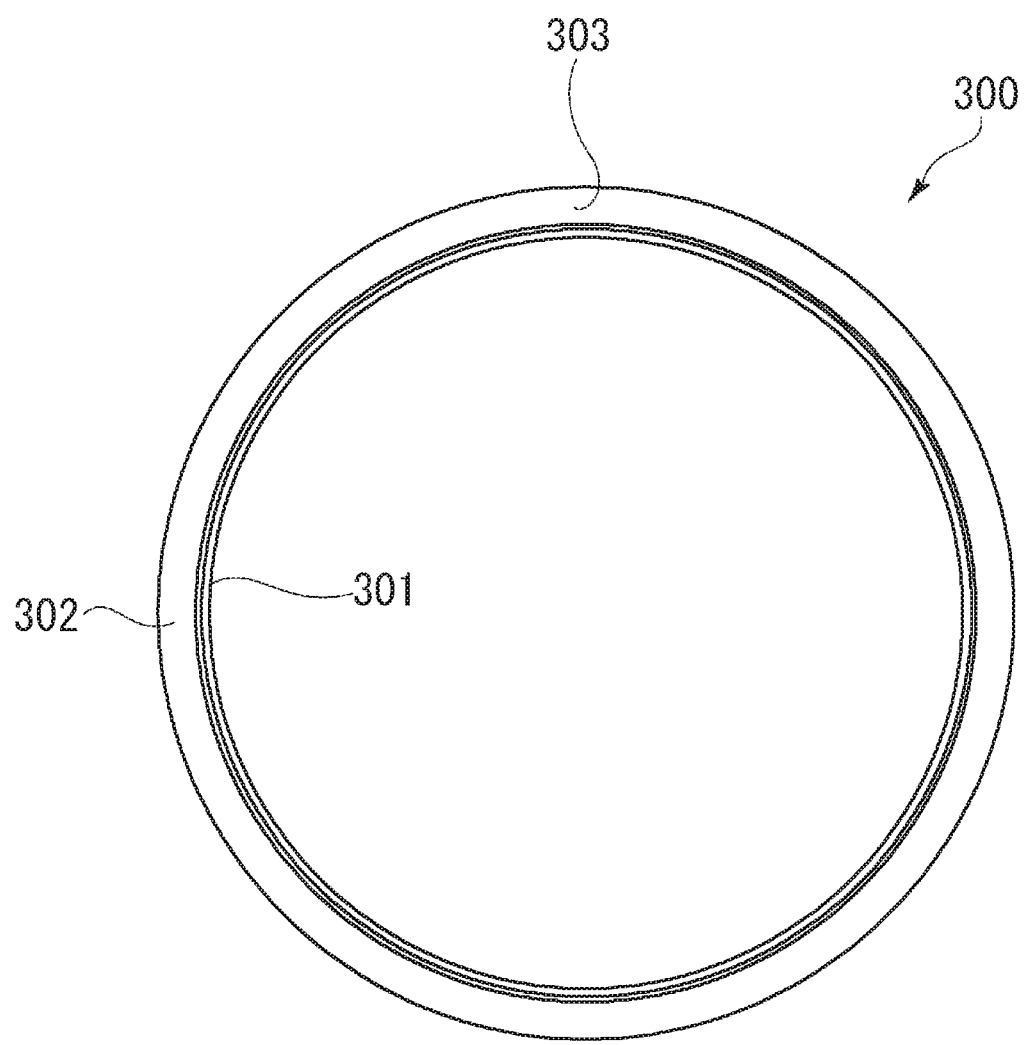
FIG. 3 is a side view of a second annular member according to Embodiment 1.
Figure 4:
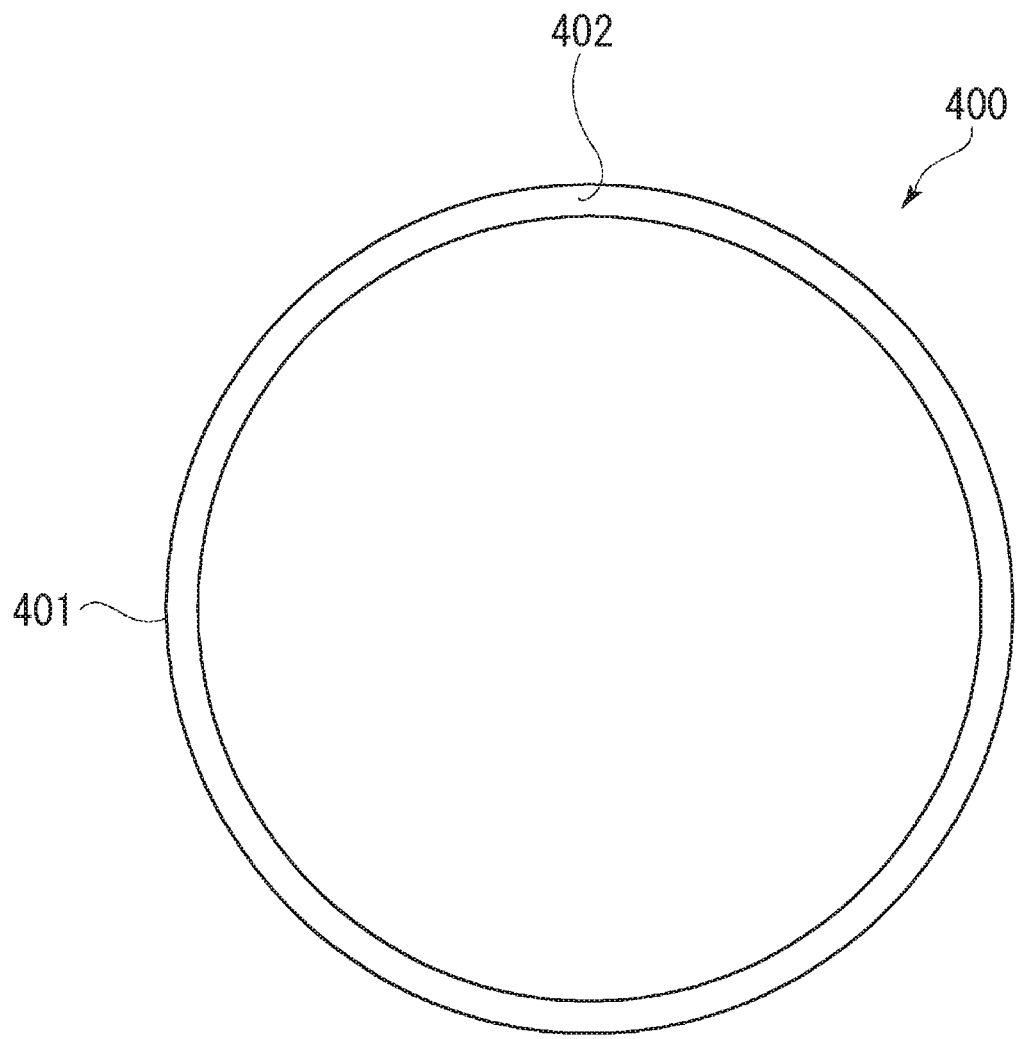
FIG. 4 is a side view of a sealing ring according to Embodiment 1.

The sealing device according to Embodiment 1 of the present disclosure will be described with reference to FIG. 1 to FIG. 4. FIG. 1 is a schematic cross-sectional view illustrating a state of use of the sealing device according to Embodiment 1. FIG. 2 is a side view of a first annular member of the sealing device according to Embodiment 1, illustrating one side thereof where a first cylindrical part is provided. FIG. 3 is a side view of a second annular member of the sealing device according to Embodiment 1, illustrating one side thereof where a second cylindrical part is provided. FIG. 4 is a side view of a sealing ring of the sealing device according to Embodiment 1.

<Configuration of Sealing Device>

As shown in FIG. 1, the sealing device 100 according to Embodiment 1 is secured to an outer circumferential surface of a shaft 20 and seals an annular gap between the shaft 20 and a housing 30 that rotate relative to each other. Thus, the sealing device 100 maintains a pressure of a sealed fluid in the sealing target region on the right side of the drawing denoted as (H), high pressure side. The sealing device 100 includes a first annular member 200, a second annular member 300, and a sealing ring 400.

As shown in FIG. 2, the first annular member 200 has a first cylindrical part 201 that is secured to the outer circumferential surface of the shaft 20, and a first flange 202 extending radially outward from the first cylindrical part 201. The first annular member 200 is formed by a pressing process from a metal disc with a shaft hole. In this embodiment, the first annular member 200 is formed from a metal sheet pretreated to have a sufficiently small surface roughness (of, e.g., arithmetic average roughness Ra of 0.8 or lower). Therefore, a first flange surface 203, which is on one side of the first flange 202 facing the first cylindrical part 201, has a surface roughness of a desired small value. The first flange 202 is formed to have an outer diameter that is smaller than the inner diameter of the shaft hole in the housing 30. The first cylindrical part 201 is formed to have an inner diameter that is equal to (or somewhat smaller than) the outer diameter of the shaft 20 so that it is firmly attached to the outer circumferential surface of the shaft 20. The axial length of the first cylindrical part 201 is set to be long enough for the sealing device 100 to be stably fixed to the shaft 20. The distal end of the first cylindrical part 201 has a tapered surface.

As shown in FIG. 3, the second annular member 300 has a second cylindrical part 301 that is secured to the outer circumferential surface of the first cylindrical part 201, and a second flange 302 extending radially outward from the second cylindrical part 301. The second annular member 300 is formed by a pressing process from a metal disc with a shaft hole similarly to the first annular member 200. The second flange 302 is formed to have an outer diameter that is smaller than the inner diameter of the shaft hole in the housing 30. The second cylindrical part 301 is formed to have an inner diameter that is equal to (or somewhat smaller than) the outer diameter of the first cylindrical part 201 so that it is firmly attached to the outer circumferential surface of the first cylindrical part 201. The axial length of the second cylindrical part 301 is set to be long enough for the second annular member 300 to be stably fixed to the first annular member 200, and larger than the thickness (axial length) of the sealing ring 400. Therefore, when the first annular member 200 and second annular member 300 are fixedly attached, there is formed a space for accommodating the sealing ring 400 between a second flange surface 303, which is on one side of the second flange 302 facing the second cylindrical part 301, and the first flange surface 203. The distal end of the second cylindrical part 301 has a tapered surface.

The sealing ring 400 is made of a resin material such as polyetheretherketone (PEEK), polyphenylene sulfide (PPS), polytetrafluoroethylene (PTFE), and the like. As shown in FIG. 4, the sealing ring 400 has an endless shape without any joints, and its outer diameter is equal to (or somewhat smaller than) the inner diameter of the shaft hole in the housing 30. The inner diameter of the sealing ring 400 is smaller than the outer diameter of the first flange 202. With the sealing ring 400 having an outer diameter and an inner diameter set as described above, when the sealing device 100 is used, there is formed a sealing surface between the sealing ring 400 and the first flange 202, as will be described later. While the sealing ring 400 in this embodiment is flat on both sides, steps or cavities may be provided as appropriate in order to reduce the effective pressure-receiving area that receives a fluid pressure applied during use of the sealing device 100.

The sealing device 100 configured as described above is assembled by bringing the first annular member 200 and second annular member 300 closer to each other from both sides of the sealing ring 400 in the axial direction and fitting the first cylindrical part 201 and second cylindrical part 301 with each other. The sealing device 100 is attached to the shaft 20, after the sealing device 100 has been assembled, by fitting the first cylindrical part 201 with the shaft 20. This way, the sealing device 100 can be assembled to the shaft 20 without radially enlarging the endless sealing ring 400. Alternatively, instead of assembling the sealing device 100 before attaching it to the shaft 20, the first annular member 200 may be fixed to the shaft 20 first, and after that, the sealing ring 400 may be set around the first cylindrical part 201 and the second annular member 300 may be fixedly attached from the right side in FIG. 1. This way, too, the sealing device 100 can be assembled to the shaft 20 without radially enlarging the endless sealing ring 400. The method of fixedly attaching the first annular member 200 to the shaft 20 is not limited to fitting, and the first cylindrical part 201 may be secured to the shaft 20 with retaining screws or the like, for example. This also applies to the method of fixedly attaching the second annular member 300 to the first annular member 200.

<Mechanism of Sealing Device in Use>

How the sealing device 100 according to this embodiment works during use will be described with reference particularly to FIG. 1. FIG. 1 illustrates a state where there is a pressure difference between two regions separated by the sealing device 100, which is brought about by the car engine being started up. In the drawing, the pressure is higher on the high pressure side (H) on the right side. With a pressure difference like this, a fluid pressure acts on the inner circumferential surface and one side 403 on the high pressure side (H) of the sealing ring 400. This fluid pressure causes the sealing ring 400 to make tight contact with the inner circumferential surface 31 of the shaft hole in the housing 30 and with the first flange 202 positioned on the low pressure side (L).

With the sealing ring 400 assuming this state, there are formed sealing surfaces between the outer circumferential surface 401 of the sealing ring 400 and the inner circumferential surface 31 of the shaft hole, and between one side 402 of the sealing ring 400 and the first flange surface 203, so that the annular gap between the shaft 20 and the housing 30 is sealed by the sealing device 100. When the shaft 20 and the housing 30 rotate relative to each other, the sealing ring 400 slides on at least one of the inner circumferential surface 31 of the shaft hole and the first flange surface 203.

<Advantages of Sealing Device According to this Embodiment>

With the sealing device 100 according to this embodiment, the endless sealing ring 400 provides a seal between the ring and the housing 30 and between the ring and the first flange 202. Therefore, the annular gap between the shaft 20 and the housing 30 can be sealed more effectively as compared to sealing rings that have joints. The configuration of the sealing device 100 allows assembling thereof without radially enlarging the endless sealing ring 400. This assembling enables easy attachment of the sealing device 100 to the shaft 20 even though the sealing device 100 uses an endless sealing ring 400. Thus the sealing device 100 achieves both of good sealing properties and mountability.

The first annular member 200 of the sealing device 100 is formed from a separate part, so that the first flange surface 203 can have a surface roughness of a desired small value relatively easily, by fabricating the annular member from a metal sheet pretreated to have a sufficiently small surface roughness. With the use of the first annular member 200 thus fabricated, the sliding resistance on the sealing ring 400, even when the sealing ring 400 slides on the first flange surface 203 during rotation of the shaft 20 and the housing 30 relative to each other, can be reduced. Therefore, the sealing device 100 can effectively reduce rotation torque of the sealing ring 400.

The sealing device 100, when assembled before fixing the first annular member 200 to the shaft 20 as described above, can be handled as one component, and can be easily assembled to the shaft 20. Since the sealing device 100 is fixed to the shaft 20 with the first flange 202 being positioned on the low pressure side (L), the device is designed such that the first flange surface 203 has a surface roughness of a desired small value. Optionally, the second annular member 300 may be fabricated from a metal sheet pretreated to have a sufficiently small surface roughness similarly to the first annular member 200, so that the second flange surface 303 can also have a surface roughness of a desired small value relatively easily. Thereby, the sealing resistance on the sealing ring 400 when the sealing ring 400 slides on the second flange 302 can also be reduced. That is, the rotation torque of the sealing ring 400 can be reduced even under a situation where the high pressure side and the low pressure side of the two regions separated by the sealing device 100 are switched. From another point of view, the mountability of the sealing device 100 is improved since it is not necessary to consider the orientation of the sealing device 100 when fixedly attaching the sealing device 100 to the shaft 20.

Variation Example

Figure 5:
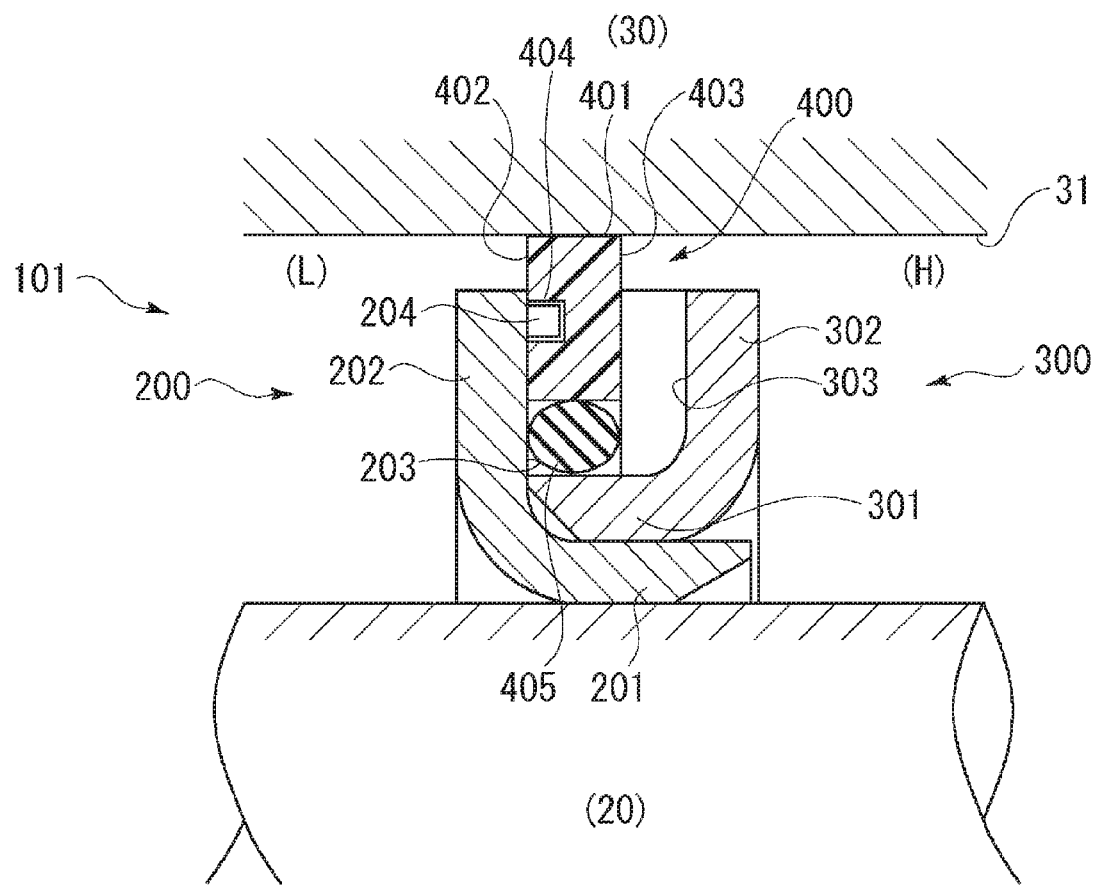
FIG. 5 is a schematic cross-sectional view illustrating a state of use of a sealing device according to a variation example.

Next, a variation example of the sealing device according to Embodiment 1 will be described with reference to FIG. 5. FIG. 5 is a schematic cross-sectional view illustrating a state of use of a sealing device according to a variation example. In the variation example, the sealing ring of the sealing device slides on the housing and not on the flange on the low pressure side. The same constituent elements as those of Embodiment 1 are given the same reference numerals and will not be described again. The same constituent elements provide substantially the same effects.

As shown in FIG. 5, the first annular member 200 of the sealing device 101 according to the variation example includes an anti-rotation portion 204 protruding from the first flange surface 203 in an axial direction. In this variation example, the first annular member 200 is formed by a pressing process from a metal sheet on which the anti-rotation portion 204 has already been formed. The sealing ring 400 has a recess 404 on the side facing the first flange 202 for receiving the anti-rotation portion 204. The sealing device 101 further includes an O-ring 405 made of a rubber-like elastic material on the radially inner side of the sealing ring 400 for urging the sealing ring 400 radially outward. In the sealing device 101 configured as described above, when the shaft 20 and the housing 30 rotate relative to each other, the sealing ring 400 is restricted from rotating relative to the first flange 202, so that it slides and rotates on the inner circumferential surface 31 of the shaft hole in the housing 30.

In conventional known sealing rings that are mounted in annular grooves of a shaft, it was difficult to form an anti-rotation portion in the annular groove for stopping the rotation of the sealing ring. In contrast, according to this variation example, since the first annular member 200 is made from a separate part, the anti-rotation portion 204 can be formed relatively easily.

Example 2

<Configuration of Sealing Device>

Figure 6:
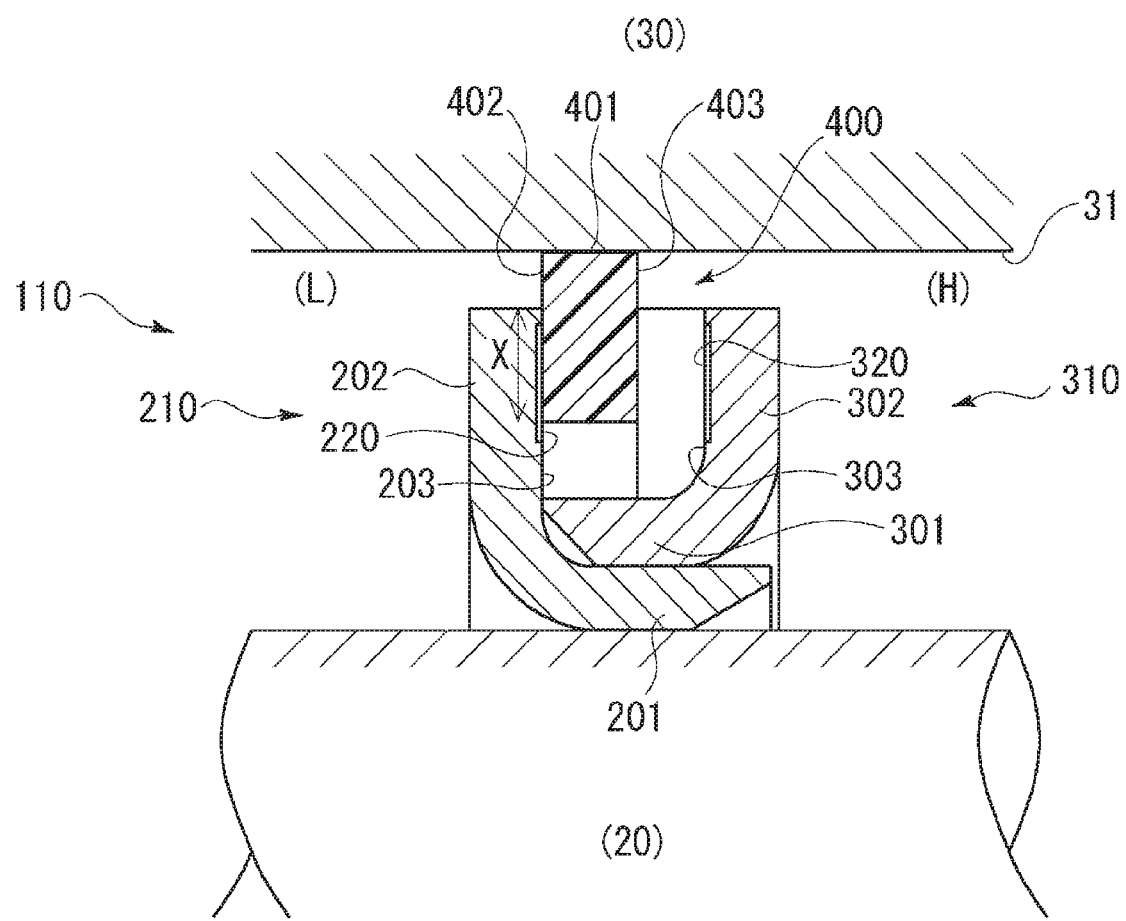
FIG. 6 is a schematic cross-sectional view illustrating a state of use of a sealing device according to Embodiment 2.
Figure 7:
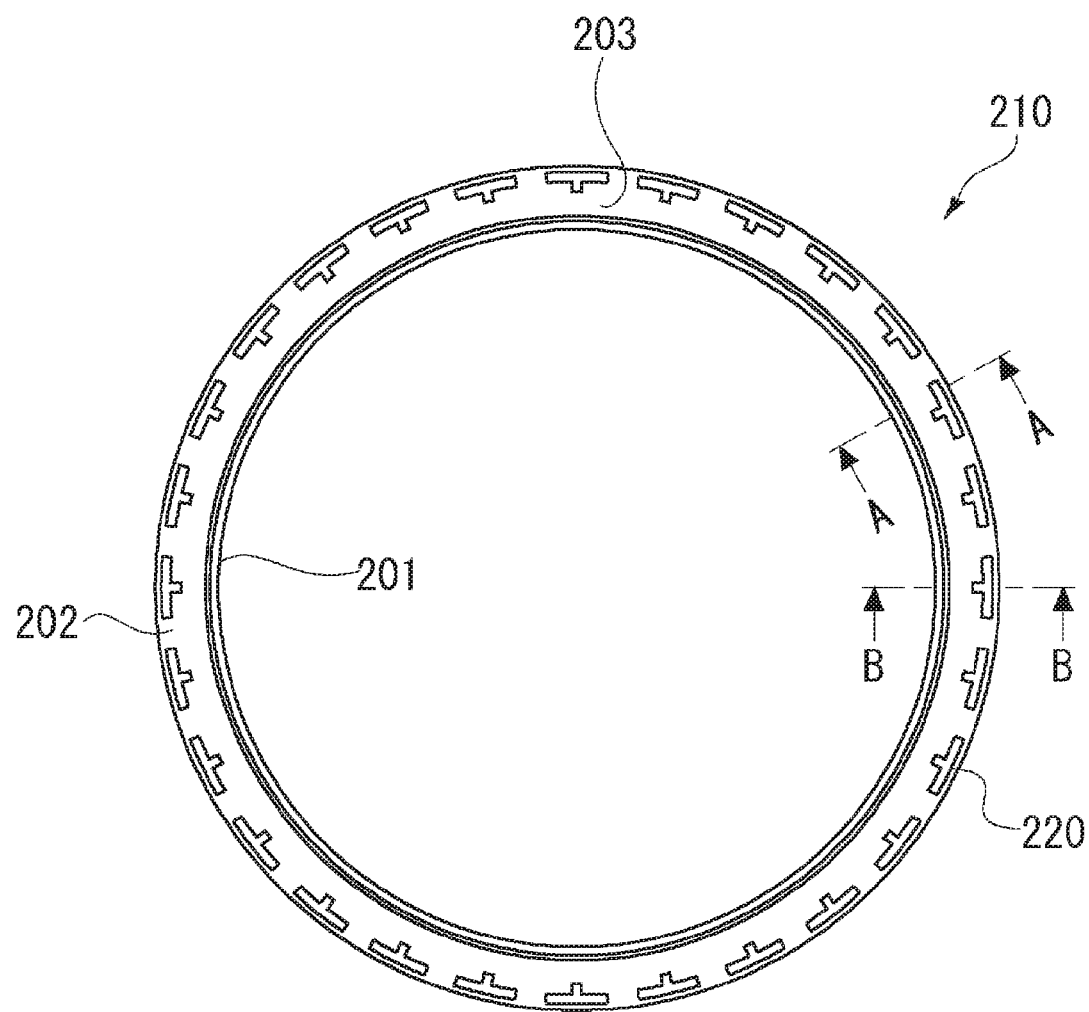
FIG. 7 is a side view of a first annular member according to Embodiment 2.
Figure 8:
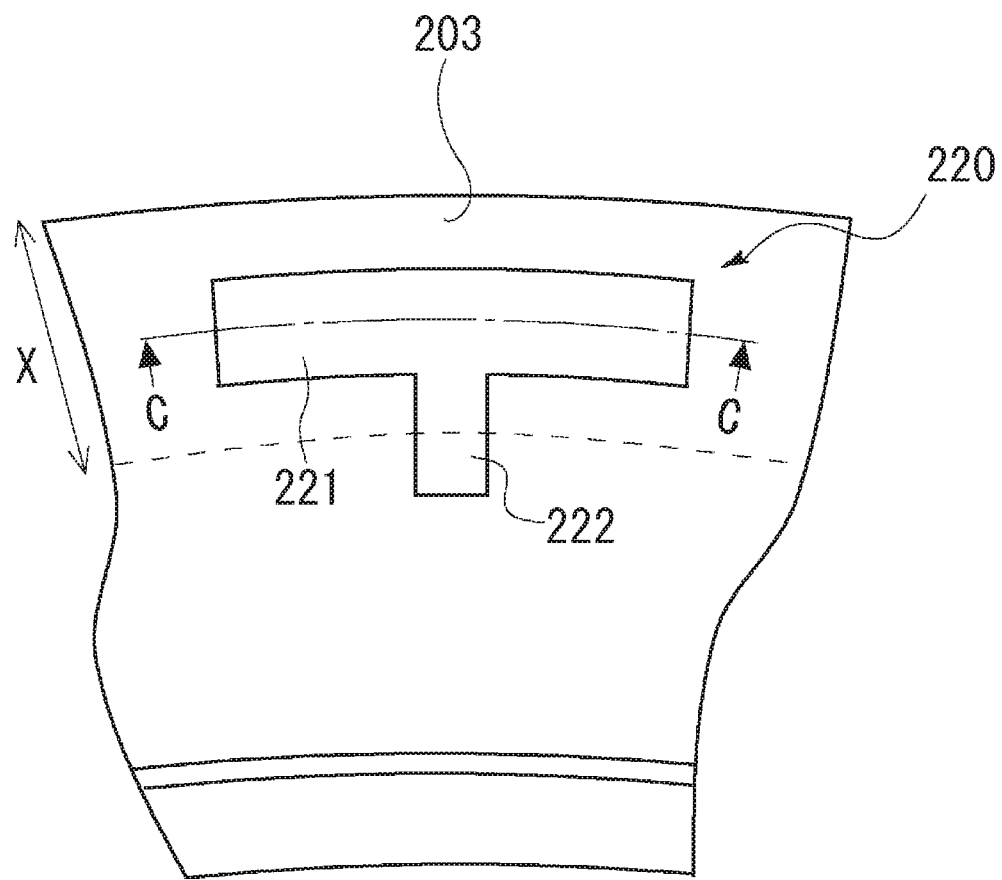
FIG. 8 is a partially enlarged view of one side of the first annular member according to Embodiment 2.
Figure 9:
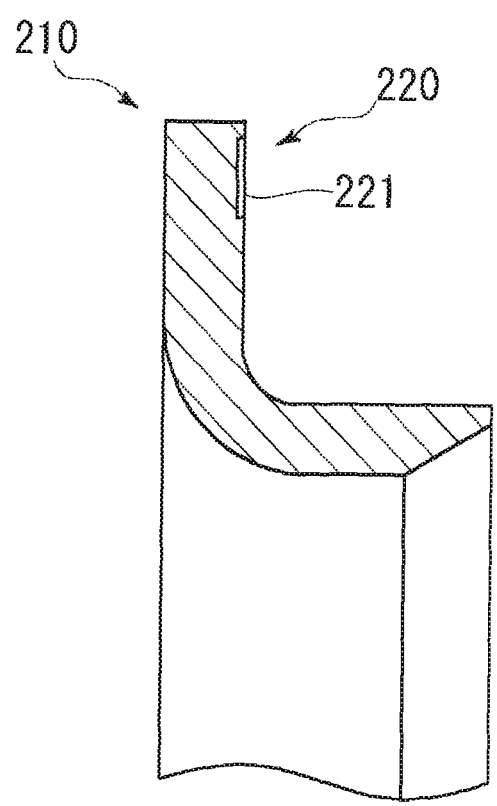
FIG. 9 is a schematic cross-sectional view of the first annular member according to Embodiment 2.
Figure 10:
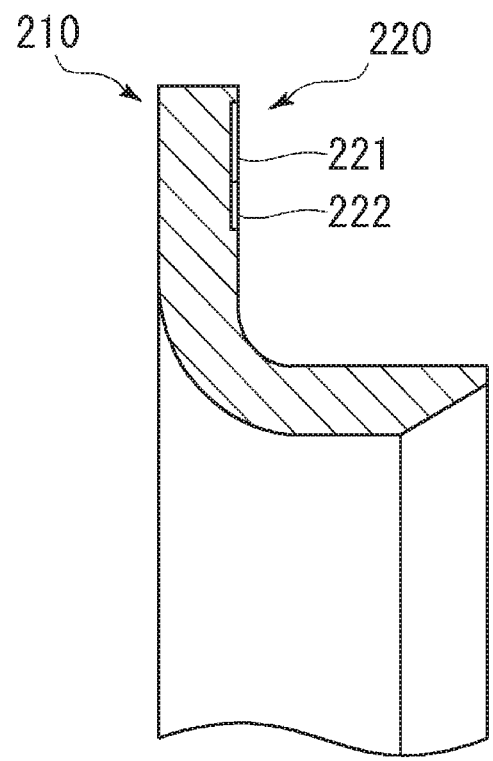
FIG. 10 is a schematic cross-sectional view of the first annular member according to Embodiment 2.
Figure 11:
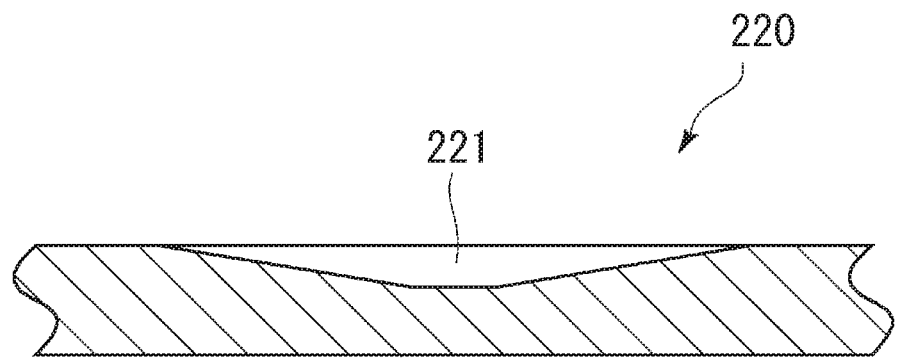
FIG. 11 is a schematic cross-sectional view illustrating the shape of a dynamic pressure generating groove provided to the first annular member according to Embodiment 2.
Figure 12:
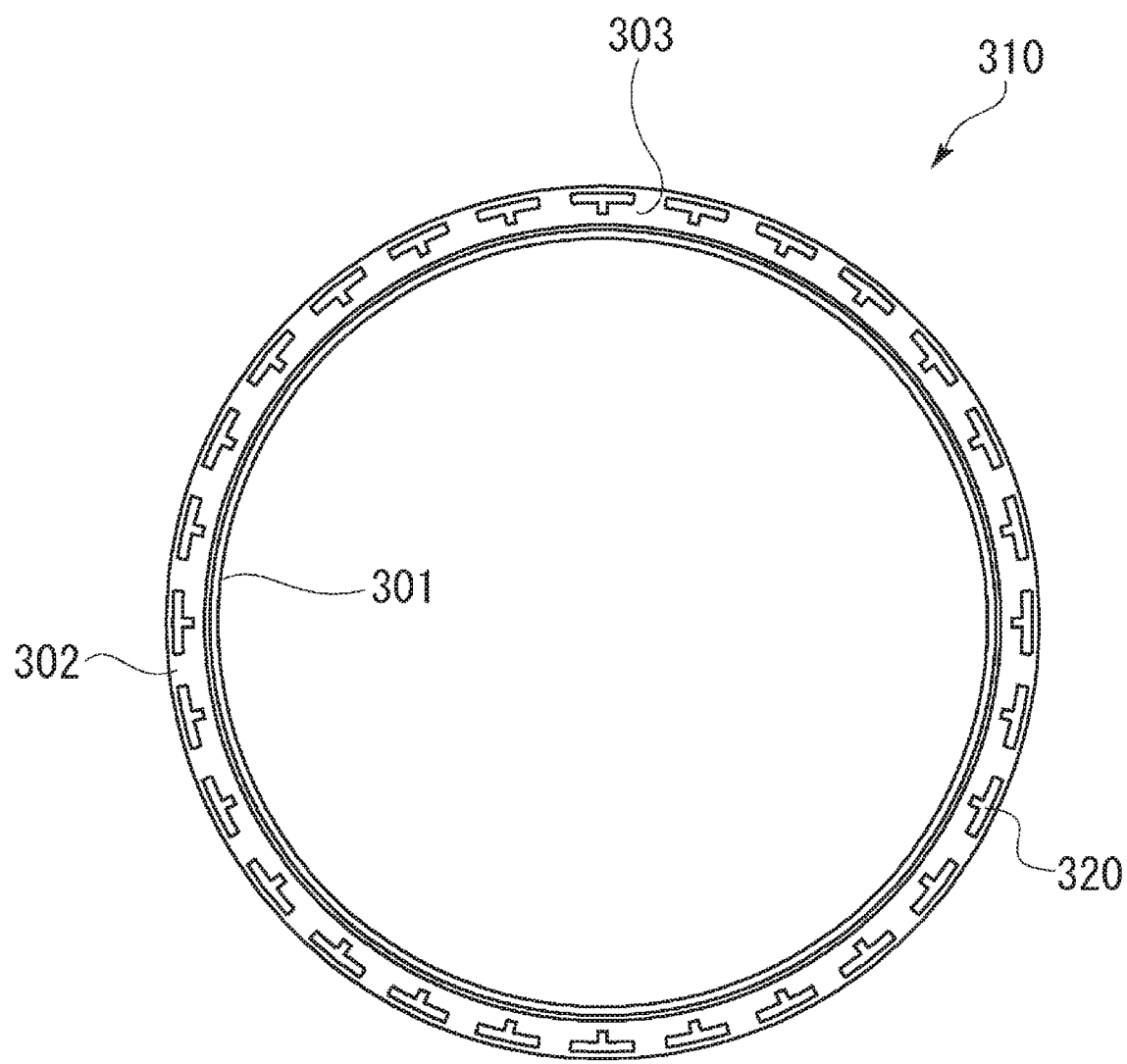
FIG. 12 is a side view of a second annular member according to Embodiment 2.

Next, the sealing device according to Embodiment 2 of the present disclosure will be described with reference to FIG. 6 to FIG. 12. The sealing device according to Embodiment 2 is different from Embodiment 1 described above in that dynamic pressure generating grooves in which a sealed fluid is introduced are formed in each side face of the first flange and second flange on the side on which the sealing ring slides. The same constituent elements as those of Embodiment 1 are given the same reference numerals and will not be described again. The same constituent elements provide substantially the same effects. FIG. 6 is a schematic cross-sectional view illustrating a state of use of the sealing device according to Embodiment 2. FIG. 7 is a side view of a first annular member of the sealing device according to Embodiment 2, illustrating one side thereof where a first cylindrical part is provided. FIG. 8 is a partially enlarged view of one side of the first annular member shown in FIG. 7. FIG. 9 to FIG. 11 are schematic cross-sectional views of the first annular member, FIG. 9 being a cross section of A-A in FIG. 7, FIG. 10 being a cross section of B-B in FIG. 7, and FIG. 11 is a cross section of C-C in FIG. 8. FIG. 12 is a side view of a second annular member of the sealing device according to Embodiment 2, illustrating one side thereof where a second cylindrical part is provided.

As shown in FIG. 6, the sealing device 110 according to Embodiment 2 includes a first annular member 210, a second annular member 310, and a sealing ring 400. The first annular member 210 is provided with the first cylindrical part 201 and first flange 202 similarly to the first annular member 200 in Embodiment 1. A plurality of circumferentially equally spaced dynamic pressure generating grooves 220 are formed in the first flange surface 203 of the first flange 202. When one side face 402 of the sealing ring 400 and the first flange surface 203 slide against each other, the sealed fluid flows into the dynamic pressure generating grooves 220 and thereby dynamic pressure is generated. As shown in FIG. 8, the dynamic pressure generating groove 220 is made up of a first groove 221 extending circumferentially with a constant radial width, and a second groove 222 that extends from a circumferential center of the first groove 221 radially inward for guiding the sealed fluid into the first groove 221.

The first grooves 221 are provided at positions within a sliding region X in which the one side face 402 of the sealing ring 400 slides (see FIG. 6 and FIG. 8). As shown in FIG. 11, the first groove 221 is formed such that its depth is constant in the circumferential direction in a central portion but gradually reduces toward both ends to merge into the flat surface. The depth of the first groove 221 is constant in the radial direction, as shown in FIG. 9. As shown in FIG. 8 and FIG. 10, the second groove 222 has a portion on the radially inner side, which extends further inward beyond the sliding region X, and a constant depth.

The first annular member 210 is pretreated to have a sufficiently small surface roughness, and formed by a pressing process from a metal disc in which the shaft hole and dynamic pressure generating grooves 220 have already been formed.

As shown in FIG. 12, the second annular member 310 is provided with the second cylindrical part 301 and second flange 302 similarly to the second annular member 300 in Embodiment 1. A plurality of circumferentially equally spaced dynamic pressure generating grooves 320 are formed in the second flange surface 303 of the second flange 302. The positions and shape of the dynamic pressure generating grooves 320 are the same as those of the dynamic pressure generating grooves 220 described above and therefore will not be described again. The second annular member 310 is pretreated to have a sufficiently small surface roughness, and formed by a pressing process from a metal disc in which the shaft hole and dynamic pressure generating grooves 320 have already been formed, similarly to the first annular member 210.

<Mechanism of Sealing Device in Use>

How the sealing device 110 according to this embodiment works during use will be described with reference particularly to FIG. 6. Similarly to FIG. 1, FIG. 6 illustrates a state where the pressure is higher on the right side of the drawing denoted by (H), high pressure side. The pressure difference between the two regions separated by the sealing ring 400 causes the sealing ring 400 to make tight contact with the inner circumferential surface 31 of the shaft hole in the housing 30 and with the first flange surface 203. When the shaft 20 and the housing 30 rotate relative to each other, one side face 402 of the sealing ring 400 slides and rotates on the first flange surface 203, and the sealed fluid flows in from the portions of the second grooves 222 radially further inside than the sliding region X (see FIG. 8). As the sealed fluid flowing into the second grooves 222 are guided into the first grooves 221 and flow out from the first grooves 221 to between the sliding surfaces, dynamic pressure is generated. When the sealing ring 400 rotates clockwise in FIG. 7 relative to the first flange surface 203 (including when the direction of rotation of the sealing ring 400 relative to the first flange surface 203 is clockwise), the sealed fluid flows out from a leading end in the clockwise direction of each first groove 221. When the sealing ring 400 rotates counterclockwise in FIG. 7 relative to the first flange surface 203 (including when the direction of rotation of the sealing ring 400 relative to the first flange surface 203 is counterclockwise), the sealed fluid flows out from a leading end in the counterclockwise direction of each first groove 221.

<Advantages of Sealing Device According to this Embodiment>

In the sealing device 110 according to this embodiment, with the sealed fluid guided into the dynamic pressure generating grooves 220, the pressure of the sealed fluid acting on the sealing ring 400 from the low pressure side and part of the pressure of the sealed fluid acting from the high pressure side are counterbalanced. Thereby, the pressure toward the first flange surface 203 that acts on the sealing ring 400 is reduced. When the sealing ring 400 slides on the first flange surface 203, the sealed fluid flows out from the first grooves 221 to between the sliding surfaces, whereby dynamic pressure is generated. This dynamic pressure applies a force on the sealing ring 400 to move away from the first flange surface 203. This way, while the pressure toward the first flange surface 203 is reduced, a force is generated in the direction away from the first flange surface 203, so that the sliding resistance on the sealing ring 400 can be effectively reduced. With the reduction of sliding resistance, the amount of heat generated by the sliding movement can also be reduced, so that the sealing device 110 can favorably be used even in high speed, high pressure environments.

The dynamic pressure generating grooves 220 are each formed by the first groove 221 and the second groove 222 extending radially inward from the circumferential center of the first groove 221, so that the dynamic pressure is generated irrespective of the rotating direction of the sealing ring 400 relative to the first flange surface 203. Since the first grooves 221 are formed at positions within the sliding region X in which they slide against the side face 402 of the sealing ring 400, the sealed fluid that has been introduced into the first grooves 221 hardly flows out in the radial direction. This way, the dynamic pressure can be effectively generated by the sealed fluid that has flowed into the dynamic pressure generating grooves 220. Moreover, the first grooves 221 are configured such that its depth decreases circumferentially toward both ends. This provides the wedge effect and allows for effective generation of the dynamic pressure.

In this embodiment, the dynamic pressure generating grooves 220 are formed in the first flange 202 that is made from a metal sheet. Considering the excellent wear resistance of metal, the dynamic pressure generating grooves 220 are expected to undergo hardly any shape change caused by wear even if the sealing device 110 is used over a long period of time. Therefore, the sliding resistance on the sealing ring can be maintained low over a long period of time as compared to when similar dynamic pressure generating grooves are formed to the sealing ring.

If dynamic pressure generating grooves of a complex shape are to be formed in a side face of an annular groove in a technical application where a resin sealing ring is assembled to an annular groove provided to a shaft, as in the conventional techniques described above, the processing is expected to be extremely difficult. In contrast, with the sealing device 110 of this embodiment, the annular member can be formed from a metal sheet that is already formed with dynamic pressure generating grooves, and therefore the metal surface on which the sealing ring slides can easily have the dynamic pressure generating grooves.

The sealing device 110 achieves both of the sealing properties and mountability for the same reasons as those of the sealing device 100 according to the previously described Embodiment 1. In the sealing device 110, the dynamic pressure generating grooves are provided to both of the first flange 202 and second flange 302. Therefore, the sliding resistance on the sealing ring 400 can be reduced even in situations where the high pressure side and low pressure side of the two regions separated by the sealing device 110 are switched. From another point of view, the mountability of the sealing device 110 is improved since it is not necessary to consider the orientation of the sealing device 110 when fixedly attaching the sealing device 110 to the shaft 20. The dynamic pressure generating grooves may be provided to only one of the first flange 202 and the second flange 302 that is on the low pressure side.

<Other Examples of Shapes of Dynamic Pressure Generating Grooves>

Figure 13:
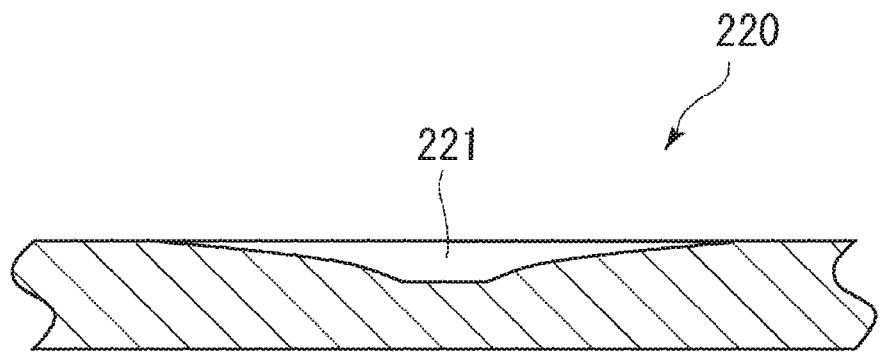
FIG. 13 is a schematic cross-sectional view illustrating another shape of the dynamic pressure generating groove according to Embodiment 2.
Figure 14:
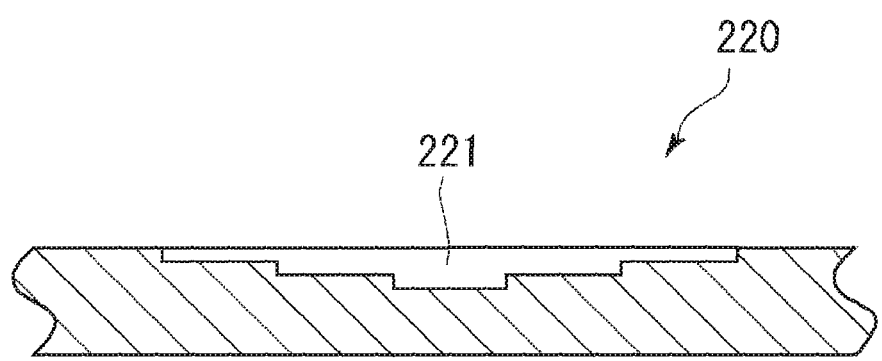
FIG. 14 is a schematic cross-sectional view illustrating yet another shape of the dynamic pressure generating groove according to Embodiment 2.
Figure 15:
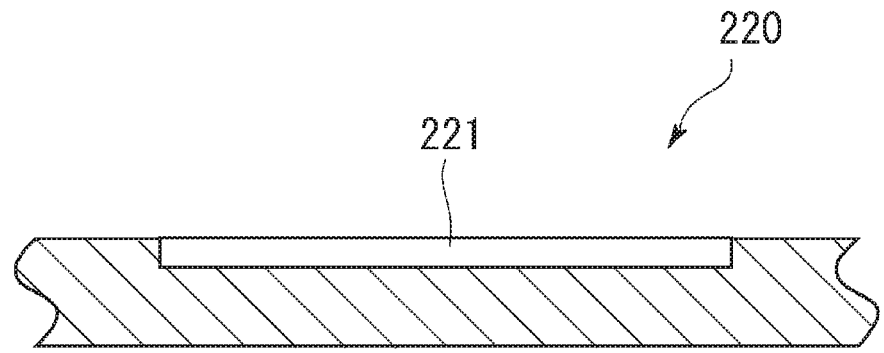
FIG. 15 is a schematic cross-sectional view illustrating a further shape of the dynamic pressure generating groove according to Embodiment 2.
Figure 16:
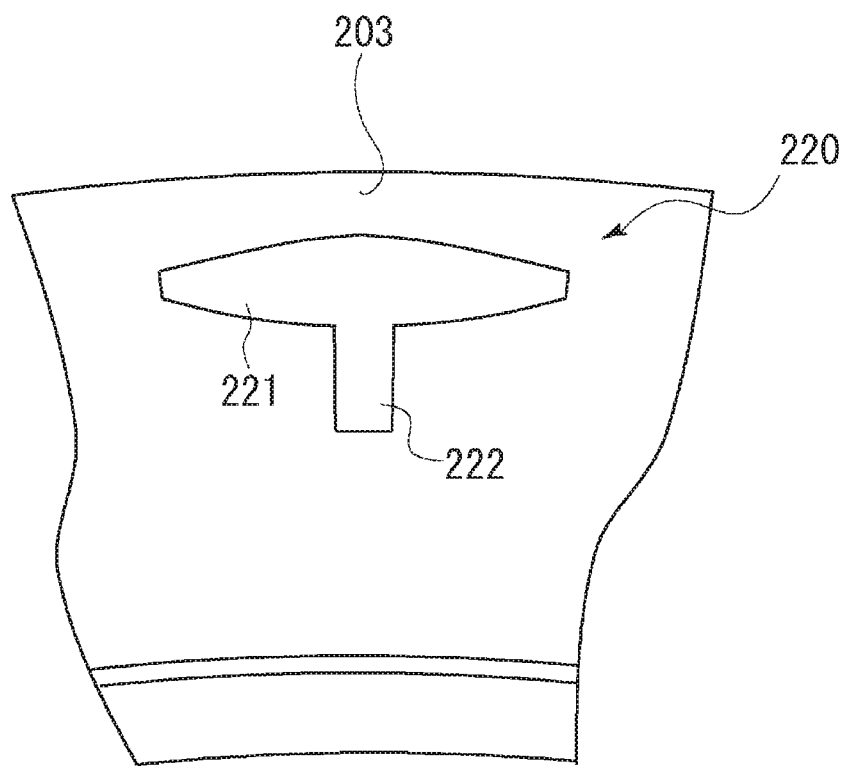
FIG. 16 is a diagram illustrating another shape of the dynamic pressure generating groove according to Embodiment 2.

Next, other shapes of dynamic pressure generating grooves 220 and 320 will be described with reference to FIG. 13 to FIG. 16. While the dynamic pressure generating grooves 220 will be described as an example, the configuration shown in FIG. 13 to FIG. 16 can be applied similarly to the dynamic pressure generating grooves 320. FIG. 13 to FIG. 15 show cross sections of line C-C in FIG. 7 similarly to FIG. 11. FIG. 16 is a partially enlarged view of a side face of the first annular member 210 similarly to FIG. 8.

FIG. 13 and FIG. 14 show other examples of the first grooves 221 with a groove bottom configured to become shallower on both sides in the circumferential direction than the central portion. FIG. 13 shows an example where the groove bottom is curved such as to become gradually shallower from the center toward both ends in the circumferential direction. FIG. 14 shows an example where the groove bottom is stepped such as to become gradually shallower from the center toward both ends in the circumferential direction. Dynamic pressure can be generated effectively by the wedge effect with both shapes. Having the that, it is also possible to generate dynamic pressure to some extent even when the first grooves 221 are formed with a circumferentially constant depth as shown in FIG. 15.

The first grooves 221 may be configured such that the radial width decreases from the center toward both ends in the circumferential direction as shown in FIG. 16. Dynamic pressure can be generated effectively by the wedge effect with such a shape. The first grooves 221 having such reducing width may have a groove bottom of any of the shapes described above.

REFERENCE SIGNS LIST

20 Shaft
30 Housing
100, 101, 110 Sealing device
200, 210 First annular member
201 First cylindrical part
202 First flange
220, 320 Dynamic pressure generating groove
300, 310 Second annular member
301 Second cylindrical part
302 Second flange
400 Sealing ring
X Sliding region

The invention claimed is:

1. A sealing device that seals an annular gap between a shaft and a housing that rotate relative to each other to maintain a pressure of a sealed fluid, the sealing device comprising:

a first annular member provided with a first cylindrical part that is secured to an outer circumferential surface of the shaft, and a first flange extending radially outward from the first cylindrical part;

a second annular member provided with a second cylindrical part that is secured to an outer circumferential surface of the first cylindrical part, and a second flange extending radially outward from the second cylindrical part; and an endless resin sealing ring disposed between the first flange and the second flange, the sealing ring providing a seal between itself and a shaft hole in the housing for the shaft to pass through, and between itself and one of the first flange and the second flange on a low pressure side, wherein the sealing ring slides on a surface of the one of the first flange and the second flange on the low pressure side, the one of the flanges on the low pressure side including a dynamic pressure generating groove on the surface on which the sealing ring slides, the groove having a circumferentially extending first groove, and a second groove extending radially inward from a circumferential center of the first groove and guiding the sealed fluid into the first groove, and the first groove being positioned within a sliding region in which the sealing ring slides.

2. The sealing device according to claim 1, wherein the first groove is formed such that its depth reduces from the circumferential center toward both ends.

3. The sealing device according to claim 1, wherein the first groove is formed such that its radial width reduces from the circumferential center toward both ends.

4. The sealing device according to claim 2, wherein the first groove is formed such that its radial width reduces from the circumferential center toward both ends.

* * * * *